United States Patent [19]

Utsumi et al.

[11] Patent Number: 5,146,103

[45] Date of Patent: Sep. 8, 1992

[54] CRUISE CONTROL APPARATUS FOR A VEHICLE

[75] Inventors: Yoshiyuki Utsumi; Kazuyori Katayama, both of Himeji, Japan

[73] Assignee: Mitsubishi Denki Kabushiki Kaisha, Tokyo, Japan

[21] Appl. No.: 605,329

[22] Filed: Oct. 30, 1990

[30] Foreign Application Priority Data

Nov. 28, 1989 [JP] Japan .................... 1-138311

[51] Int. Cl.$^5$ ............................ B60K 31/00
[52] U.S. Cl. ............................ 307/10.1; 180/179; 364/426.04
[58] Field of Search ............... 307/9.1, 10.1; 180/170, 180/, 172, 174, 178, 179; 364/426.04

[56] References Cited

U.S. PATENT DOCUMENTS

| | | | |
|---|---|---|---|
| 4,964,048 | 10/1990 | Tanaka et al. | 180/179 |
| 5,025,379 | 6/1991 | Etoh et al. | 180/179 |
| 5,040,121 | 8/1991 | Etoh et al. | 180/179 |
| 5,044,457 | 9/1991 | Aikman | 180/178 |
| 5,064,015 | 11/1991 | Yamamoto et al. | 180/176 |

OTHER PUBLICATIONS

Section 37-05 Speed Control System with Resume--Ford FIG. 7 wiring and Vacuum Diagram, pp. 37-05-1, 37-05-2, & 37-05-17.

*Primary Examiner*—Jeffrey A. Gaffin
*Attorney, Agent, or Firm*—Sughrue, Mion, Zinn, Macpeak and Seas

[57] ABSTRACT

A cruise control apparatus for a vehicle is disclosed which is free from influences resulting from variations in the ground voltage level as well as variations in the voltage in the power supply so as to effectively prevent malfunctions of the apparatus and hence enhance reliability in operation. To this end, the cruise control apparatus includes cruise control switches such as a cancellation switch, a set/coast switch, a resume/acceleration switch, etc., which are provided on the steering wheel of the vehicle and which are connected in parallel with each other. The cruise control switches have an output terminal and an input terminal, the switches being selectively operated to change the output voltage at the output terminal so as to provide a plurality of command signals for cruise control. A control unit is connected to the output terminal of the cruise control switches through the intermediary of a slip ring for performing a cruise control operation in response to the cruise control command signals. A power supply is commonly connected to the input terminal of the cruise control switches and the control unit.

2 Claims, 2 Drawing Sheets

CRUISE CONTROL APPARATUS FOR A VEHICLE

BACKGROUND OF THE INVENTION

The present invention relates to a cruise control apparatus for a vehicle capable of making the vehicle cruise at a constant speed.

In general, a cruise control apparatus for a vehicle is constructed such that a control unit drives, upon receipt of a command signal which is generated by a cruise control switch when it is operated by the driver, a throttle valve in an intake pipe of an internal combustion engine to open and close through the action of an actuator so as to make the vehicle travel at a target speed.

An example of such a cruise control apparatus including a cruise control switch and a control unit is diagrammatically illustrated in FIG. 2. The known cruise control apparatus illustrated includes a cruise control switch 1 and a control unit 2. The cruise control switch 1 is, together with a horn switch 3 and an audio control switch 4, incorporated in a steering wheel (not shown) and constitutes a steering wheel buitl-in switch circuit 5. The horn switch 3 is connected at one end thereof through a slip ring 6 to a horn relay 7 which is in turn connected to a power supply $V_1$ and a horn 8. The horn switch 3 is also connected at the other end thereof to ground through a bearing in a steering shaft (not shown). The cruise control switch 1 further includes a cancel switch 9 for cancelling a cruise control operation, a set/coast switch 10 for setting a cruise control operation during a non-cruise control operation as well as automatically decelerating the vehicle during a cruise control operation, and a resume/acceleration switch 11 for automatically resuming the vehicle to cruise during a non-cruise control operation as well as accelerating the vehicle during a cruise control operation. The set/coast switch 10 is connected in series with a resistor $R_1$ to form a first serial connection. The resume/acceleration switch 11 is connected in series with a resistor $R_2$ to form a second serial connection. The first serial connection including the set/coast switch 10 and the resistor $R_1$, the second serial connection including the resume/acceleration switch 11 and the resistor $R_2$, and the cancellation switch 9 are connected in parallel with each other. The cruise control switch 1 is connected at one end thereof to the control unit 2 through a slip ring 12, and at the other end thereof to the horn switch 3 and commonly therewith to ground. The audio control switch 4 is connected at one end thereof to an audio control unit 14 through a slip ring 13, and at the other end thereof to a power supply $V_2$ through a slip ring 15. Inside the control unit 2, an output of the cruise control switch 1 which is input to the control unit 2 via the slip ring 12 is connected through a resistor $R_3$ to a power supply $V_3$ and input to the respective positive terminals of comparators 16 through 18. The negative terminals of the comparators 16 through 18 are connected to the power supply $V_3$ through corresponding resistors $R_4$ through $R_6$, respectively, and at the same time to ground via resistor $R_7$. The voltages $V_H$, $V_M$ and $V_L$ are predetermined so as to satisfy the following relationship: $V_H > V_M > V_L$. The output terminals of the comparators 16 through 18 are connected to a power supply of 5 volts via resistors $R_8$ through $R_{10}$, respectively, and the outputs $V_a$ through $V_c$ of these comparators are input to a central processing unit (CPU) 19.

In operation, when the set/coast switch 10 is turned on with the vehicle travelling under non-cruise control, the input voltage $V_i$ fed to the control unit 2 becomes equal to $\{R_1/(R_1+R_3)\} \times V_3$, which is between $V_H$ and $V_M$, so that the output voltage $V_a$ of the comparator 16 becomes high while the output voltages $V_b$, $V_c$ remain low. As a result, the CPU 19 is operated to recognize a command signal from the set/coast switch 10, and accordingly drive the throttle valve. Similarly, when the resume/acceleration switch 11 and the cancellation switch 9 are turned on, the CPU 19 also recognizes a command signal therefrom and drives the throttle valve. These operational relationships are tabulated in Table I below.

TABLE I

| Control SW | Input Voltages $V_i$ | Output Voltages | | |
|---|---|---|---|---|
| | | $V_a$ | $V_b$ | $V_c$ |
| Set/Coast SW | $\{R_1/(R_1 + R_3)\} \times V_3$ | 0 | 5 | 5 |
| Resume/Accel SW | $\{R_2/(R_2 + R_3)\} \times V_3$ | 0 | 0 | 5 |
| Cancellation SW | 0 | 0 | 0 | 0 |
| All SWs Off | $V_3$ | 5 | 5 | 5 |

With the above-mentioned known cruise control apparatus, however, the switches 9 through 11 are connected to ground commonly with the horn switch 3, so the ground voltage level of these switches varies due to switching on of the horn switch 3, vibrations of the steering system and the like. In addition, since the switches 9 through 11 are grounded through the bearing in the steering shaft, the ground voltage level also varies due to a secular change in the contact resistance of the bearing which gradually increases with time. For these reasons, undesirable situations sometimes take place in which cruise control cannot be set when the set/coast switch 10 is turned on, or cruise control cannot be cancelled when the cancellation switch 9 is turned on.

SUMMARY OF THE INVENTION

The present invention is intended to obviate the above-described problems of the known cruise control apparatus, and has for its object the provision of a novel and improved cruise control apparatus for a vehicle which is free from influences resulting from variations in the ground voltage level as well as variations in the voltage in the power supply so as to effectively prevent the above-mentioned erroneous operations and hence enhance reliability in operation.

In order to achieve the above object, according to the present invention, there is provided a cruise control apparatus for a vehicle comprising:

cruise control switch means provided on the steering wheel of the vehicle and having a plurality of switch elements connected in parallel with each other, the cruise control switch means having an output terminal and an input terminal, the switch elements being selectively operated to change the output voltage at the output terminal of the cruise control switch means so as to provide a plurality of command signals for cruise control;

a control unit connected to the output terminal of the cruise control switch means through the intermediary of a slip ring for performing a cruise control operation in response to the cruise control command signals; and a power supply commonly connected to the input terminal of the cruise control switch means and the control unit.

Preferably, the switch elements comprise a cancellation switch for cancelling cruise control, a set/coast switch for setting a coasting operation and a resume/acceleration switch for resuming an accelerating operation.

The above and other objects, features and advantages of the present invention will become more readily apparent from the ensuing detailed description of a preferred embodiment of the invention taken in conjunction with the accompanying drawings.

DESCRIPTION OF THE PREFERRED EMBODIMENT

The present invention will now be described in detail with reference to a preferred embodiment as illustrated in the accompanying drawings.

Figure 1:
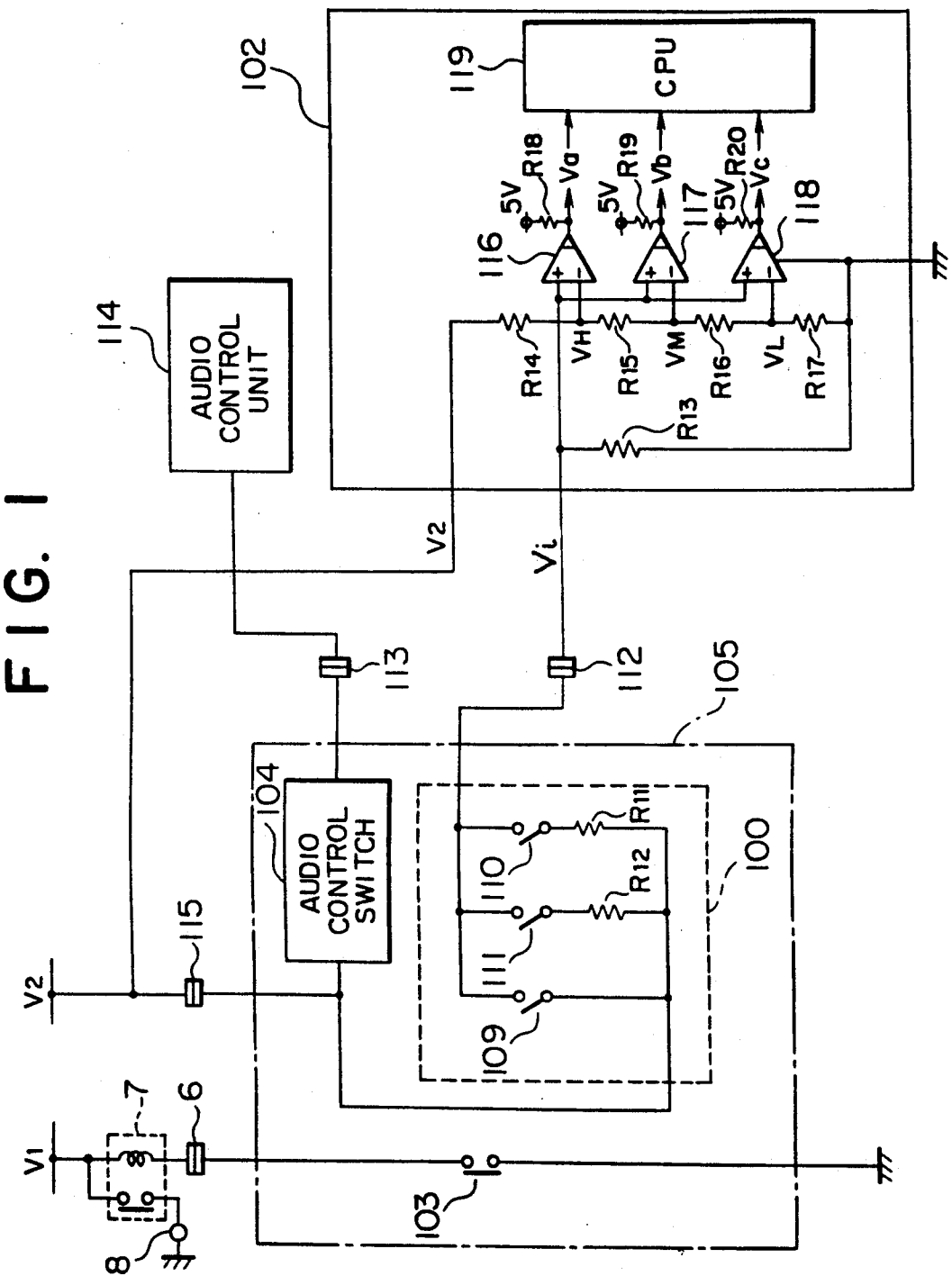
FIG. 1 is a schematic circuit diagram of a cruise control apparatus for a vehicle in accordance with the present invention.
Figure 2:
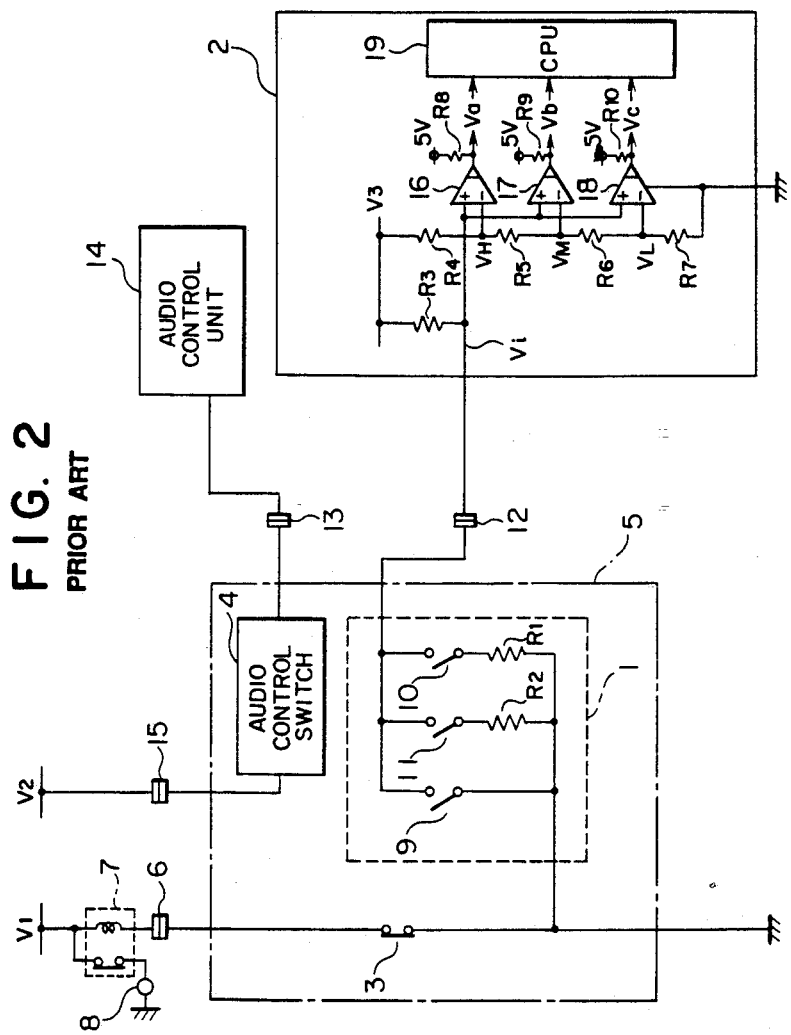
FIG. 2 is a view similar to FIG. 1, but showing a prior art cruise control apparatus.

In FIG. 1, there is illustrated an electric circuit for a cruise control apparatus constructed in accordance with the principles of the present invention. In this figure, a set/coast switch 110 is connected in series with a resistor $R_{11}$, and a resume/acceleration switch 111 is connected in series with a resistor $R_{12}$, these switches 110 and 111 being connected in parallel with a cancellation switch 109 so as to together constitute a cruise control switch 100, which is incorporated in a steering wheel built-in switch circuit 105. The cruise control switch 100 has one end connected to a control unit 102 through a slip ring 112, and the other end not grounded but instead connected through a slip ring 115 to a power supply $V_2$ for an audio control switch 104. The control unit 102 includes comparators 116 through 118 which have their negative terminals connected to the power supply $V_2$. A resistor $R_{13}$ is connected between the slip ring 112 and ground. Resistors $R_{14}$ through $R_{20}$ are the same as, or correspond to, the resistors $R_4$ through $R_{10}$ in the aforementioned known cruise control apparatus illustrated in FIG. 2. The construction of this embodiment other than the above is the same as that of the known cruise control apparatus of FIG. 2.

Next, the operation of this embodiment will be described. First, the operational states of this embodiment are tabulated in Table II below.

TABLE II

| Control SW | Input Voltages $V_i$ | Output Voltages | | |
|---|---|---|---|---|
| | | $V_a$ | $V_b$ | $V_c$ |
| Set/Coast SW | $\{R_{13}/(R_{11} + R_{13})\} \times V_2$ | 0 | 0 | 5 |
| Resume/Accel SW | $\{R_{13}/(R_{12} + R_{13})\} \times V_2$ | 0 | 5 | 5 |
| Cancellation SW | $V_2$ | 5 | 5 | 5 |
| All SWs Off | 0 | 0 | 0 | 0 |

When the set/coast switch 110 is turned on, the input voltage $V_i$ to the control unit 102 becomes equal to $\{R_{13}/(R_{11}+R_{13})\} \times V_2$, which is between $V_M$ and $V_L$, and $V_a$ and $V_b$ both become equal to 0 volts, and $V_c$ to 5 volts. Thus, $V_c$ of 5 volts is input to the CPU 119 which then determines that the set/coast switch 110 is turned on, and performs control based on this determination. On the other hand, when the resume/acceleration switch 111 is turned on, $V_i$ becomes equal to $\{R_{13}/(R_{12}+R_{13})\} \times V_2$, which is between $V_M$ and $V_H$, and $V_a$ becomes equal to 0 volts, and $V_b$ and $V_c$ both to 5 volts. As a result, $V_b$ and $V_c$ of 5 volts are input to the CPU 119 which then determines that a resume/acceleration signal is input thereto, and performs control based on this determination. Further, when the cancellation switch 109 is turned on, Vi becomes equal to $V_2$, and $V_a$, $V_b$ and $V_c$ all equal to 5 volts. Thus, $V_a$, $V_b$ and $V_c$ of 5 volts are input to the CPU 119 which then determines that a cancellation signal is input thereto, and performs cancellation control.

In this embodiment, the cruise control switch terminals are not connected to ground, so they are free from any influences due to variations in the ground voltage level. Further, the power supply of $V_2$ volts is commonly for the cruise control switch 100 and the control unit 102 so that variations in the power supply of $V_2$ result in no erroneous operations of the CPU 119 which would be experienced with the aforementioned known cruise control apparatus. Moreover, there is no need for increasing the number of slip rings 6, 112, 113 and 115, or for enhancing the preciseness of the resistors $R_{11}$ through $R_{13}$. Accordingly, a highly reliable cruise control apparatus can be provided at low costs.

As described in the foregoing, according to the present invention, the input terminals of the control switch are not connected to ground, so the output of the control switch is free from influences of variations in the ground level. Further, the use of a common power supply for both of the control switch and the control unit can avoid the influences of variations in the power supply, thus preventing a resultant malfunction of the cruise control apparatus.

What is claimed is:

1. A cruise control apparatus for a vehicle, comprising:
   cruise control switch means (100) incorporated in a steering wheel of the vehicle and having a plurality of switch elements connected in parallel with each other, said cruise control switch means having an output terminal and an input terminal, said switch elements being selectively operated to change an output voltage at the output terminal of said cruise control switch means so as to provide a plurality of command signals for cruise control;
   a control unit (102) disposed externally of the steering wheel and connected to the output terminal of said cruise control switch means through the intermediary of a first slip ring (112) for performing a cruise control operation in response to the cruise control command signals; and
   a power supply (V2) disposed externally of the steering wheel and commonly connected to the input terminal of said cruise control switch means through the intermediary of a second slip ring (115) and directly to said control unit such that the output voltage of the cruise control switch means is free from adverse influences due to variations in a ground potential.

2. A cruise control apparatus for a vehicle according to claim 1, wherein said switch elements comprise a cancellation switch for cancelling cruise control, a set/coast switch for setting a coasting operation and a resume/acceleration switch for resuming an accelerating operation.

* * * * *